United States Patent [19]

Seo

[11] Patent Number: 5,249,167
[45] Date of Patent: Sep. 28, 1993

[54] OPTICAL PICKUP APPARATUS WHICH INCLUDES A PLATE-LIKE ELEMENT FOR SPLITTING A RETURNING LIGHT BEAM INTO DIFFERENT LIGHT BEAMS HAVING DIFFERENT FOCUSSING POINT

[75] Inventor: Katsuhiro Seo, Tokyo, Japan

[73] Assignee: Sony Corporation, Tokyo, Japan

[21] Appl. No.: 735,381

[22] Filed: Jul. 24, 1991

[30] Foreign Application Priority Data

Jul. 31, 1990 [JP] Japan .................... 2-203516

[51] Int. Cl.⁵ .............................. G11B 7/135
[52] U.S. Cl. ...................... 369/44.14; 369/110
[58] Field of Search ............ 369/44.12, 110, 112, 369/44.14

[56] References Cited

U.S. PATENT DOCUMENTS 4,797,868  1/1989  Ando ................. 369/44.1 Z
4,863,246  9/1989  Anthon .............. 369/110

FOREIGN PATENT DOCUMENTS

62-14340   1/1987  Japan ............. 369/44.12
62-200542  9/1987  Japan ............. 369/44.12
62-266739 11/1987  Japan ............. 369/44.12
63-52342   3/1988  Japan ............. 369/44.12

Primary Examiner—Donald E. McElheny, Jr.
Attorney, Agent, or Firm—Limbach & Limbach

[57] ABSTRACT

The present invention provides an optical pickup apparatus for reading informational signals written in a recording medium such as magneto-optical disc in which a flux of reflected light from a recording medium which is irradiated with a flux of light in inclinedly incident from one side upon a flat plate like transparent member having one side which is a polarization reflection surface and the other side which is a total reflection surface and fluxes of light reflected on the one side and the other side of the flat plate like transparent member are detected by a photo detecting element, whereby simplification of the structure is achieved.

9 Claims, 5 Drawing Sheets

OPTICAL PICKUP APPARATUS WHICH INCLUDES A PLATE-LIKE ELEMENT FOR SPLITTING A RETURNING LIGHT BEAM INTO DIFFERENT LIGHT BEAMS HAVING DIFFERENT FOCUSSING POINT

BACKGROUND OF THE INVENTION

The present invention relates to an optical pickup apparatus for reading informational signals written on, for example, a magneto-optical disc.

So-called magneto-optical discs comprising a signal recording layer which is perpendicularly magnetizable so that informational signals can be written in accordance with differences in the direction of magnetization of the signal recording layer have heretofore been proposed as recording media for recording informational thereon.

In order to write the informational signals on the magneto-optical disc, only small domains of the signal recording layer is heated to a temperature higher than a Curie temperature by means such irradiating the domains of the signal recording layer with a converged laser beam to cause the coercive force to disappear and an external magnetic field is applied to the small domains to change the magnetization of the small domains. In such a manner, writing of informational signals is performed by changing the magnetization direction in the signal recording layer for each small domain.

In order to read the informational signals which have been written in the magneto-optical disc, a flux of light having a signal polarization direction such as a laser beam is converged and impinged upon the signal recording layer to detect the polarization direction of the reflected light of the flux of light. The flux of light changes the polarization direction depending upon the direction of magnetization due to so-called Kerr effect when it is reflected on the signal recording layer. Accordingly, the differences is magnetization direction of the signal recording layer can be detected by detecting the polarization direction of the reflected light of the flux.

Figure 9:
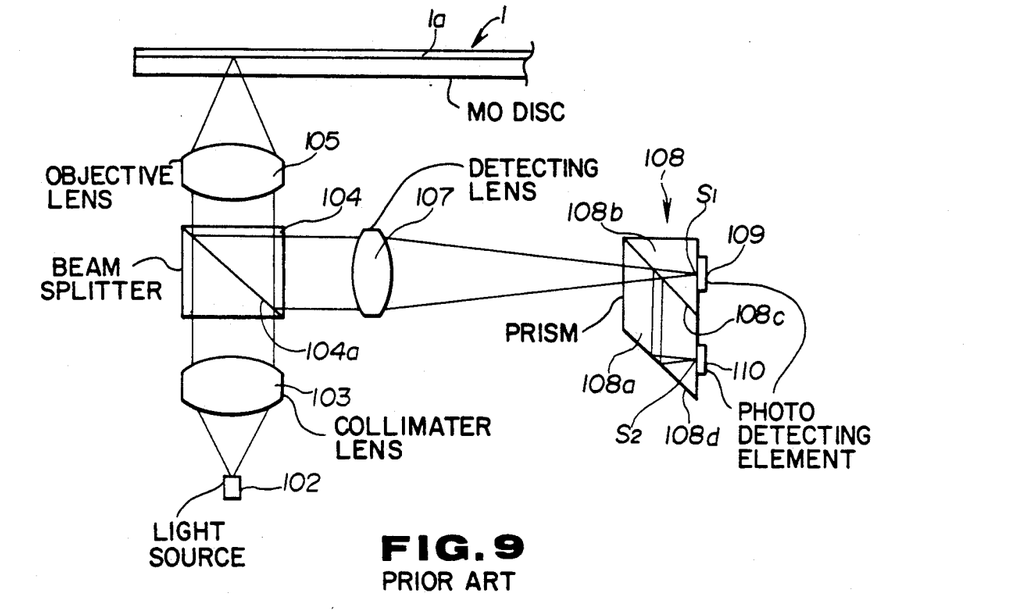
FIG. 9 is an elevational view schematically showing the structure of a prior art optical pickup apparatus of the present invention.

Therefore, in order to read the informational signals from magneto-optical disc, an optical pickup apparatus is used which is formed so that the signal layer $1a$ of the magneto-optical disc 1 is irradiated with the laser beam and the light reflected from the signal recording layer $1a$ is detected as shown in FIG. 9.

The optical pickup apparatus has a light source 102 such as semiconductor laser and is formed so that a flux of light emitted from the light source 102 is converged and is impinged upon the surface of the signal recording layer $1a$ via optical devices such as a collimator lens 103, a beam splitter 104 and an objective lens 105.

The optical pickup apparatus is also formed so that the reflected light of the flux of light which is incident upon the surface of the signal recording layer $1a$ is introduced to a detecting optical system via the objective lens 105 and the reflection surface $104a$ of the beam splitter 104 to detect the polarization direction of the reflected light.

The detecting optical system in the optical pickup apparatus may includes a detecting lens 107 for converging the flux of light incident upon the detecting optical system, first and second photo-detecting element 109 and 110, and a prism 108 disposed in an optical path between the detecting lens 107 and each of the photo-detecting elements 109 and 110.

The prism 108 is formed into a prism having a substantially trapezoidal cross section by bonding a parallelogrammatic prism $108a$ to a triangular prism $108b$ each other at a polarization reflection surface $108c$. The flux of light which has transmitted through the detecting lens 107 is firstly substantially normally incident upon one side of the parallelogrammatic prism $108a$ constituting an upper bottom portion of the prism 108 and is then incliningly incident upon the polarization reflection surface $108c$. A part of the flux of light is reflected by the polarization reflection surface $108c$ depending upon the polarization direction and the remaining flux will be transmitted through the surface $108c$. The ratio of the reflected light to the transmitted light changes depending upon the polarization direction of the flux of light.

The flux of light which has been transmitted through the polarization reflection surface $108c$ is detected as a first beam spot $S_1$ by the first photo-detecting element 109 secured to the triangular prism $108b$ forming a part of the lower bottom portion of the prism 108. On the other hand, the flux of light reflected by the polarization reflection surface $108c$ is reflected by the slanted side of the parallelogrammatic prism $108a$ forming the slanted side of the prism 108 is detected as a second beam spot $S_2$ by the second photo-detecting element 110 secured to the parallelogrammatic prism $108a$ forming the other portion of the lower bottom portion of the prism 108.

The differential signal between the photo detection signals outputted from the photo-detecting elements 109 and 110 which detect the fluxes of light separated by the polarization reflection surface $108c$, that is, the difference between the amounts of light of the beam spots $S_1$ and $S_2$ will become a read signal of the information signal written in the magneto-optical disc 1.

Figure 10:
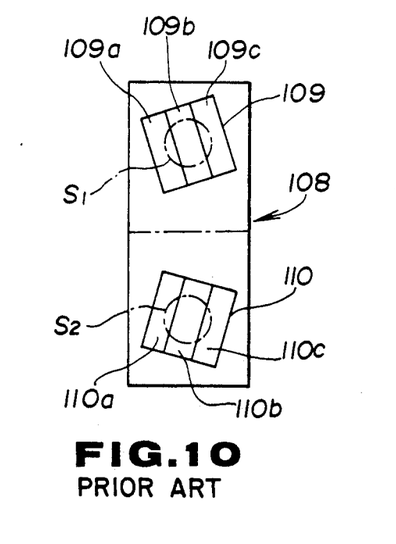
FIG. 10 is an enlarged plan view showing a photo-detecting element constituting the prior art optical pickup apparatus.

Each of the photo-detecting elements 109 and 110 comprises three parallel photo-receiving areas as shown in FIG. 10. That is, the first photo-detecting element 109 comprises first to third photo-receiving areas $109a$, $109b$ and $109c$. The second photo-detecting element 110 comprises fourth to sixth photo-receiving areas $110a$, $110b$ and $110c$. The convergence condition of the flux of light on the photo-receiving elements 109 and 110 is changed depending upon the focus error of the flux of light focussed on the surface of the signal recording layer $1a$ of the magneto-optical disc 1.

Therefore, so-called focus error signal representative of the amount of the focus error on the surface of the signal recording layer $1a$ of the magnetic-optical disc 1 can be obtained by so-called internal and external differential method in which a signal representative of a difference between the photo detection outputs from the photo-receiving areas $109b$ and $110b$ in the central sides of the photo-detecting elements 109 and 110 and the photo detection outputs from the photo-receiving areas $109a$, $109c$, $110a$, $109c$ on the opposite sides of the photo-detecting elements 109 and 110. That is, if the photo detection outputs from the first to sixth photo-receiving areas $109a$, $109b$, $109c$, $110a$, $110b$ and $110c$ are represented as A, B, C, D, E and F respectively, the focus error signal Fe can be determined by the formula as follows:

$$Fe = (B - (A + C)) - (E - (D + F))$$

In an optical pickup apparatus comprising a prism 108 having the above-mentioned polarization reflection surface 108c, the first and second photo-detecting elements 109 and 110 have boundary lines between photo-receiving areas which are inclined with each other. It is hard to keep the high precision of the securing position of each photo-detecting elements 109 and 110 since the photo-detecting elements 109 and 110 prism 108 by means such as bonding. The beam spots $S_1$ and $S_2$ are formed on the photo-detecting elements 109 and 110, respectively by securing the photo-detecting elements 109 and 110 to the prism 108 so that they are inclined with each other and by adjusting the position of the prism 108.

Accordingly, if a so-called tracking error occurs in which the flux of light incident upon the signal recording layer 1a is deviated relative to a recording track formed on the signal recording layer 1a of the magneto-optical disc 1 in the optical pickup apparatus, a so-called focus offset occurs since the beam spots $S_1$ and $S_2$ will be moved in a direction inclined with respect to the boundary lines of the photo-receiving areas constituting each photo-detecting element 109 and 110. The condition on which the focus offset occurs is defined as a condition that a focus error signal representing as if a focus error occurred is outputted although the focus error does not actually occur on the surface of the signal recording layer 1a.

In order to prevent the focus offset from occurring, an option is possible that the photo detecting elements 109 and 110 are mounted by adjusting the position thereof to make parallel the boundary lines between the photo-receiving areas forming the photo-detecting elements 109 and 110. However, the structure of the thus formed optical pickup apparatus becomes more complicated in structure and its assembly and manufacturing becomes more hard.

The present invention was proposed in view of the above-mentioned circumstances. It is an object of the present invention to provide an optical pickup apparatus in which a focus offset is prevented from occurring and reading of informational signals written on a recording medium can be satisfactorily achieved without complicating the structure.

In order to overcome the above-mentioned problem and to accomplish the object, the present invention provides an optical pickup apparatus comprising a flat plate like transparent member having one side which is a polarization reflection surface and the other sides which is a total reflection surface, upon which light reflected from a recording medium which is irradiated with a flux of light is inclinatingly incident from the one side thereof; and a photo-detecting element for detecting the flux of light reflected by the one side and the other side of the flat plate transparent member which is irradiated with the flux of light.

As mentioned above, in the optical pickup apparatus of the present invention, light reflected from a recording medium which is inclinedly incident from one side upon a flat plate like transparent member having the one side which is a polarization reflection surface and the other side which is a total reflection surface is separated at the one side thereof into two fluxes of light depending upon the direction of polarization. Since the flux of light reflected on the one side and the flux of light which has transmitted through the one side and has been reflected on the other side of the transparent member are detected by a photo-detecting elements, the polarization direction of reflected light from the recording medium can be detected by comparing the intensity of these fluxes of light.

DESCRIPTION OF THE PREFERRED EMBODIMENTS

Detailed embodiments of the present invention will now be described with reference to the drawings.

In the embodiments, an optical pickup apparatus of the present invention is formed as an optical pickup apparatus for reading informational signals written on an magneto-optical disc which serves as a recording medium.

Figure 1:
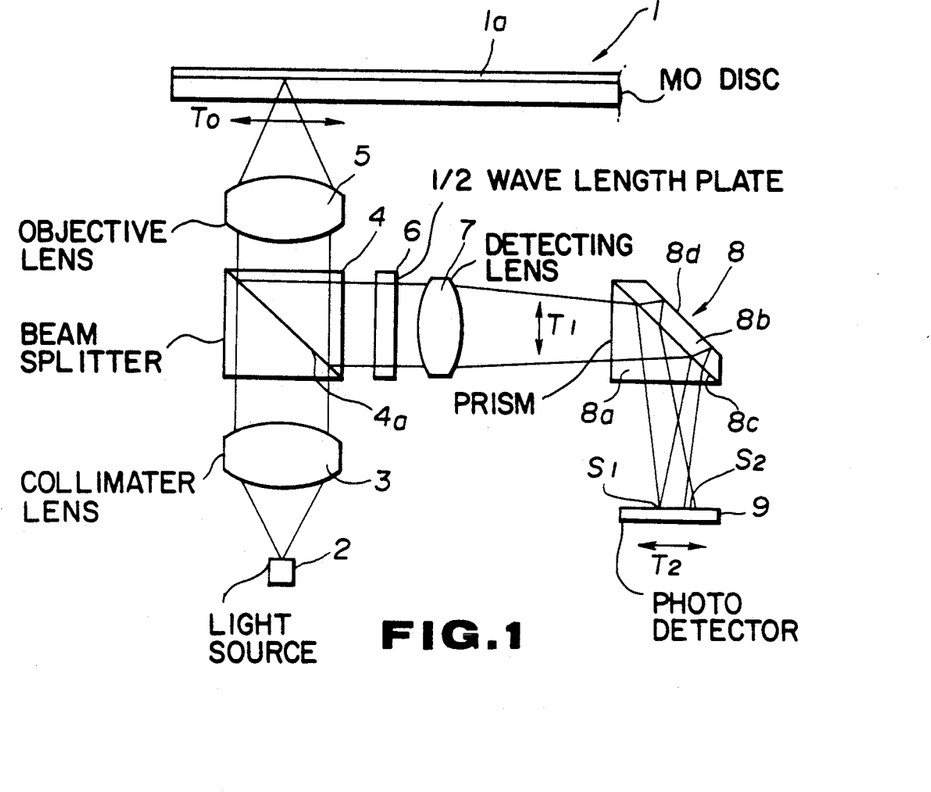
FIG. 1 is an elevational view schematically showing the structure of an optical pickup apparatus of the present invention.

The optical pickup apparatus is formed as shown in FIG. 1 so that a light flux is converged and impinged upon the surface of a signal recording layer 1a of a magneto-optical disc 1 and the light reflected on the signal recording layer 1a is detected by a photo-detecting element 9.

The optical pickup apparatus has a light source 2 such as semiconductor laser for emitting a flux of light having a single wave length and a single polarization direction. The flux of light emitted from the light source 2 is converted into parallel light flux by a collimator lens 3. The flux of light transmits through the beam splitter 4 and is incident upon an objective lens 5. The objective lens 5 converges the flux of incident light onto the surface of the signal recording layer 1a of the magneto-optical layer 1.

The objective lens 5 is supported on an objective lens drive mechanism (not shown) so that it is movable in an direction of an optical axis. The objective lens drive mechanism is adapted to move the objective lens 5 in response to a focus error signal representative of the distance between a beam spot formed with the flux of light converged by the objective lens 5 and the surface of the signal recording layer 1a, that is, the amount of focus error.

The signal recording layer 1a is formed so that it is perpendicularly magnetized. The direction of the magnetization in each small domain is changed in response to the written informational signals. The reflected light of the flux of light which has been converged and impinged upon the surface of the signal recording layer 1a has changed the polarization direction due to so-called Kerr effect depending upon the magnetization direction of the signal recording layer 1a.

The flux of light which has been impinged upon the surface of the signal recording layer 1a is reflected by the surface and is incident upon the objective lens 5 again. The flux of light incident upon the objective lens 5 again is converted into parallel rays of light and is returned to the beam splitter 4. The flux of light returned to the beam splitter 4 is reflected by the surface 4a of the beam splitter 4 and is incident upon a detecting lens via a half wave-length plate 6 without returning toward the collimator lens 3. The half wave-length plate 6 is a so-called rotatory polarizer which rotates the polarization direction of the flux of incident light by 90°. The detecting lens 7 converges the flux of incident light.

The flux of light which has transmitted through the detecting lens 7 is incident on a prism 8. The prism 8 comprises a triangular prism 8a and a flat plate like transparent member 8b bonded to the slanted side of the triangular prism 8a. The triangular prism 8a and the flat plate like transparent member 8b are formed of the same optical material having the same refraction index. One side of the flat plate like transparent member 8b to which the triangular prism 8a is bonded is coated with an dielectric film to provide a polarization reflection surface 8c having a different reflection factor depending on the direction of polarization of the incident flux of light. The other side of the flat plate like transparent member 8b which is opposite to the one side is made a so-called total reflection surface 8d so that the flux of light which has transmitted through the polarization reflection surface 8c is reflected thereon.

A part of the flux of light which is incident on the prism 8 from the triangular prism 8a is reflected on the polarization reflection surface 8c of the flat plate like transparent member 8b and the remaining flux is transmitted through the polarization reflection surface 8c. The flux of light reflected on the polarization reflection surface 8c is then transmitted through the triangular prism 8a and is exited from the prism 8. The flux of light transmitted through the polarization reflection surface 8c is then reflected on the total reflection surface 8d and is transmitted through the flat plate like transparent member 8b and the triangular prism 8a and exited from the prism 8. The flux of light which has been transmitted through the prism 8 in such a manner will travel along separated optical paths depending upon the difference of it's polarization direction.

Figure 2:
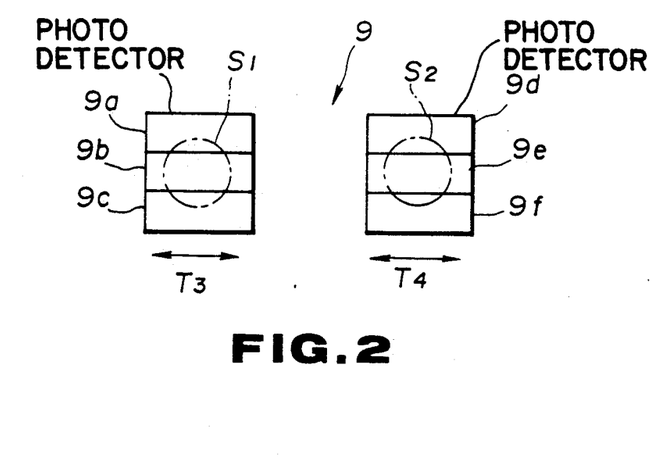
FIG. 2 is an enlarged plan view showing a photo-detecting element constituting the optical pickup apparatus.

The light receiving surface of the photo detecting element 9 has a plurality of light receiving areas each receiving the flux of light, the optical path of which is separated by the prism 8 as shown in FIG. 2. The photo detecting element 9 receives each of flux of light at the plurality of light receiving area and is capable of independently outputting photo detection signals each corresponding to the intensity of light at light receiving area through a plurality of leads (not shown).

In the photo detecting element 9, a first beam spot $S_1$ formed of the first flux of light reflected on the polarization reflection surface 8c is formed on first to third photo receiving areas 9a, 9b and 9c.

A second beam spot $S_2$ formed by the second flux of light transmitted through the polarization reflection surface 8c is formed on fourth to sixth photo receiving areas 9d, 9e and 9f. The first beam spots $S_1$ is received by each of the photo receiving areas immediately in front of the focal point of the detecting lens 7 while the second beam spot $S_2$ is received by each of the photo receiving areas immediately in rear of the focal point of the detecting lens 7.

The first to third photo receiving areas 9a, 9b and 9c are formed into a substantially rectangular shape and are successively arranged in direction of shorter side thereof. The fourth to sixth photo receiving areas 9d, 9e and 9f are similarly formed into a substantially rectangular shape and are successively arranged in a direction of shorter side thereof. The boundary lines between first, second and third photo receiving areas 9a, 9b and 9c are in parallel with those between the fourth, fifth and sixth photo receiving areas 9d, 9e and 9f.

If photo detection outputs from the first to sixth photo receiving areas 9a, 9b, 9c, 9d, 9e and 9f are represented as $E_A$, $E_B$, $E_C$, $E_D$, $E_E$ and $E_F$, respectively, a so-called focus error signal representative of the amount of focus error on the signal recording layer 1a of the magneto-optical disc 1 is represented as Fe, the focus error signal Fe can be expressed by a formula as follows:

$$Fe = (E_B - (E_A + E_C)) - (E_E - (E_D + E_F))$$

The focus error signal Fe is fed to a servo circuit for controlling the objective lens drive apparatus.

The intensity of light of one of the first and second beam spots $S_1$ and $S_2$ decreases as the intensity of light of the other spots increases. The intensity of light of one of beam spots increases as the intensity of light of the other beam spot decreases. Accordingly, if a read out signal of the information signal written on the magneto-optical disc 1 is represented as Mo, the read out signal can be expressed by the formula as follows:

$$Mo = (E_A + E_B + E_C) - (E_D + E_E + E_F)$$

Also in the optical pickup apparatus, the direction of the boundary lines between photo receiving areas of the photo receiving element 9 are arranged in a direction corresponding to the tangential direction of recording tracks formed on the signal recording layer 1a of the magneto-optical disc 1. Therefore, even if a so-called tracking error in which the flux of light incident upon the surface of the signal recording layer 1a is deviated in a direction across the recording tracks, represented by an arrow To in FIG. 1 is caused, the focus error signal Fe is prevented from being changed. That is, if the tracking error is caused, the flux of light which is incident upon the prism 8 is deflected in a direction represented by an arrow $T_1$ in FIG. 1 and the first and second beam spots $S_1$ and $S_2$ are moved in a direction represented by an arrow $T_2$ in FIG. 1. At this time, the beam spots $S_1$ and $S_2$ are moved in direction represented by arrows $T_3$ and $T_4$ in FIG. 2, respectively on the photo receiving areas of the photo detecting element 9.

Therefore, even if the flux of light incident upon the magneto-optical disc 1 is largely moved in a direction across the recording tracks by a light deflecting device such as so-called Galvano-mirror in the optical pick up apparatus, a focus error signal can be obtained without any problems. In other words, a focus offset due to so-called tracking error can be prevented from occurring in the optical pickup apparatus of the present invention in spite of simple structure.

Figure 3:
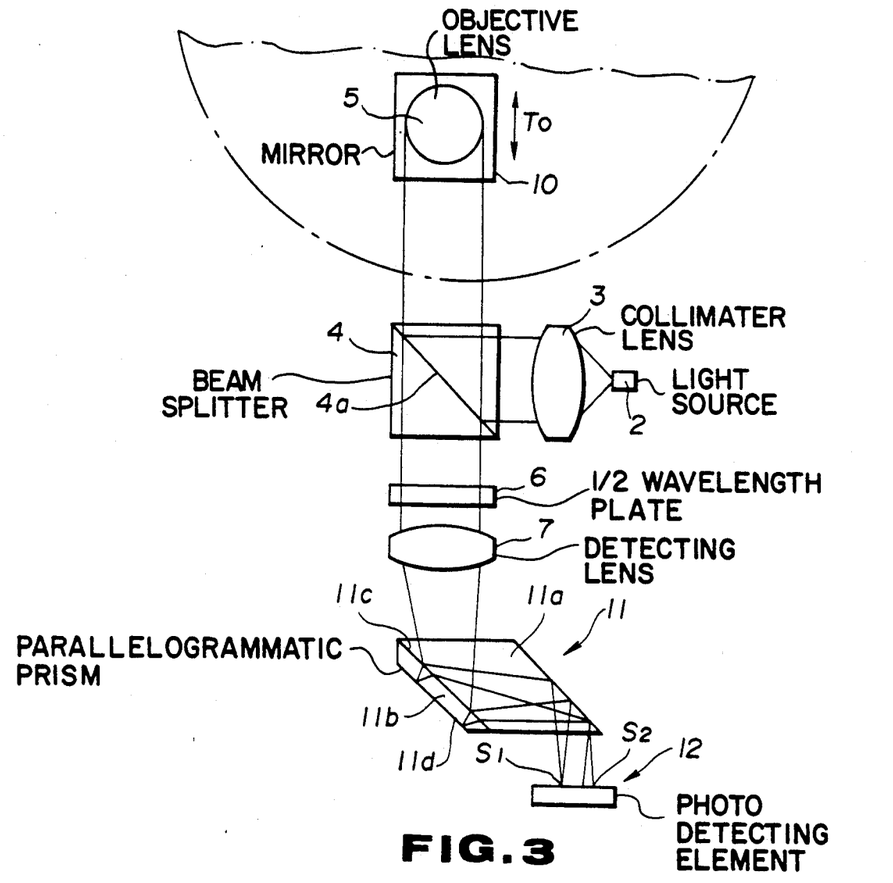
FIG. 3 is an elevational view schematically showing the other structure of an optical pickup apparatus.

Referring now to FIG. 3, there is shown another embodiment of the optical pickup apparatus of the present invention in which optical devices are arranged in a direction along a magneto-optical disc 1 to make the apparatus thinner in a depth direction of the magneto-optical disc 1. Like reference numerals represent like components.

In the optical pick up apparatus, a flux of light emitted from light source 2 in a direction along the magneto-optical disc 1 is converted into a flux of parallel light and thereafter it is reflected on the reflection surface 4a of the beam splitter 4 and is then incident upon a reflection mirror 10. The reflection mirror 10 is adapted to reflect the flux of the incident light so that the flux of the reflected light is incident upon an objective lens 5 disposed in an opposing manner to the magneto-optical disc 1. The objective lens 5 converges the flux of the incident light upon the signal recording layer 1a of the magneto-optical disc 1.

The flux of the light reflected by the signal recording layer 1a is returned to the beam splitter through the objective lens 5 and the reflective mirror 10. The flux of the light reflected by the signal recording layer 1a is transmitted through the reflection surface 4a and is incident upon a detecting lens 7 through a half wavelength plate 6. The detecting lens 7 converges the flux of the incident light so that the converged light is incident upon a prism 11.

The prism 11 comprises a parallelogrammatic prism 11a and a flat plate like transparent member 11b bonded to the slanted side of the parallelogrammatic prism 11a. The parallelogrammatic prism 11a and the flat plate like transparent member 11b are formed of the same optical material having the same refraction index. One side of the flat plate like transparent member 11b to which the parallelogrammatic prism 11a is bonded is coated with an dielectric film to provide a polarization reflection surface 11c having a different reflection factor depending on the direction of polarization of the incident fluxes of light. The other side of the flat plate like transparent member 11b which is opposite to the one side is made a so-called total reflection surface 11d so that the flux of light which has transmitted through the polarization reflection surface 11c is reflected thereon.

A part of the flux of light which is incident on the prism 11 from the bottom of the parallelogrammatic 11a is reflected on the polarization reflection surface 11c of the flat plat like transparent member 11b depending upon the polarization direction and the remaining flux is transmitted through the polarization reflection surface 11c. The flux of light reflected on the polarization reflection surface 11c is then transmitted through the parallelogrammatic prism 11a and is exited from the prism 11. The flux of light transmitted through the polarization reflection surface 11c is then reflected on the total reflection surface 11d and is transmitted through the flat plate like transparent member 11b and the parallelogrammatic prism 11a and exited from the prism 11. The flux of light which has been transmitted through the prism 11 in such a manner will travel along separated optical paths depending upon the difference of it's polarization direction.

Figure 4:
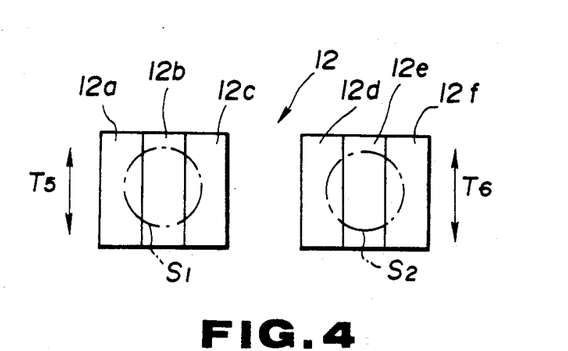
FIG. 4 is an enlarged plan view showing a photo-detecting element constituting the optical pickup apparatus shown in FIG. 3.

The light receiving surface of the photo detecting element 12 which is disposed to detect the flux of light transmitted through the prism 11 has a plurality of light receiving areas each receiving the flux of light, the optical path of which is separated by the prism 8 as shown in FIG. 4. The photo detecting element 12 receives each of flux of light at the plurality of light receiving area and is capable of independently outputting photo detection signals each corresponding to the intensity of light at light receiving area through a plurality of leads (not shown).

In the photo detecting element 12, a first beam spot $S_1$ formed of the first flux of light reflected on the polarization reflection surface 11c is formed on first to third photo receiving areas 12a, 12b and 12c. A second beam spot $S_2$ formed by the second flux of light transmitted through the polarization reflection surface 11c is formed on fourth to sixth photo receiving areas 12d, 12e and 12f.

The first to third photo receiving areas 12a, 12b and 12c are formed into a substantially rectangular shape and are successively arranged in direction of shorter side thereof. The fourth to sixth photo receiving areas 12d, 12e and 12f are similarly formed into a substantially rectangular shape and are successively arranged in a direction of shorter side thereof. The boundary lines between first, second and third photo receiving areas 12a, 12b and 12c are in parallel with those between the fourth, fifth and sixth photo receiving areas 12d, 12e and 12f.

If photo detection outputs from the first to sixth photo receiving areas 12a, 12b, 12c, 12d, 12e and 12f are represented as $E_A$, $E_B$, $E_C$, $E_D$, $E_E$ and $F_F$, respectively, a so-called focus error signal representative of the amount of focus error on the signal recording layer 1a of the magneto-optical disc 1 is represented as Fe, the focus error signal Fe can be expressed as similarly to the above-mentioned optical pickup apparatus by a formula as follows:

$$Fe = (E_B - (E_A + E_C)) - (E_E - (E_D + E_F))$$

The focus error signal Fe is fed to a servo circuit for controlling the objective lens drive apparatus.

The intensity of light of one of the first and second beam spots $S_1$ and $S_2$ decreases as the intensity of light of the other spots increases. The intensity of light of one of beam spots increases as the intensity of light of the other beam spot decreases. Accordingly, if a read out signal of the informational signal written on the magneto-optical disc 1 is represented as Mo, the read out signal can be expressed by the formula as follows:

$$Mo = (E_A + E_B + E_C) - (E_D + E_E + E_F)$$

Also in the optical pickup apparatus, the direction of the boundary lines between photo receiving areas of the photo receiving element 12 are arranged in a direction corresponding to the tangential direction of recording tracks. Therefore, even if a so-called tracking error in which the flux of light incident upon the surface of the signal recording layer 1a is deviated in a direction across the recording tracks, represented by an arrow To in FIG. 3 is caused, the focus error signal Fe is prevented from being changed. That is, if the tracking error is caused, the first and second beam spots $S_1$ and $S_2$ are moved in a direction of the boundary lines as represented by an arrows $T_5$ $T_6$ in FIG. 4.

A focus offset due to so-called tracking error can be also prevented from occurring in the optical pickup apparatus in spite of simple structure as mentioned above.

Figure 5:
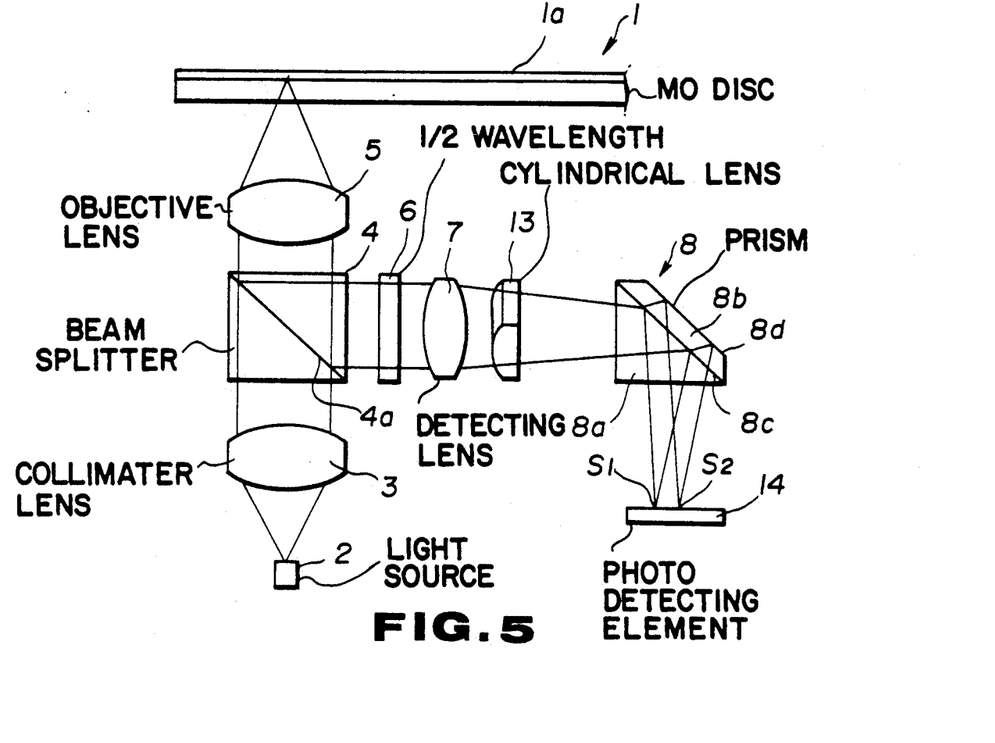
FIG. 5 is an elevational view schematically showing the other structure of an optical pickup apparatus.

Referring now to FIG. 5, there is shown a further embodiment of an optical pick up apparatus of the present invention in which a cylindrical lens 13 is disposed in an optical path along which a flux of light reflected by an magneto-optical disc 1 travels to a photo detecting element to cause an astigmatism in the flux of light and an focus error signal is detected in accordance with the condition of the astigmatism. Like numerals represent like components.

This optical pickup apparatus comprises a light source 2, a collimator lens 3. A beam splitter 4 and an objective lens 5, etc. and is formed so that a flux of light is incident upon the surface of a signal recording layer 1a of the magneto-optical disc 1 as is similar to the above-mentioned optical pickup apparatus.

In the optical pickup apparatus, the flux of light which was reflected on the surface of the signal recording layer 1a and reached at the detection lens 7 via the objective lens 5 and the beam splitter 4 transmits through the detection lens 7 and thereafter transmits through the cylindrical lens 13 and is incident upon the prism 8.

Figure 6:
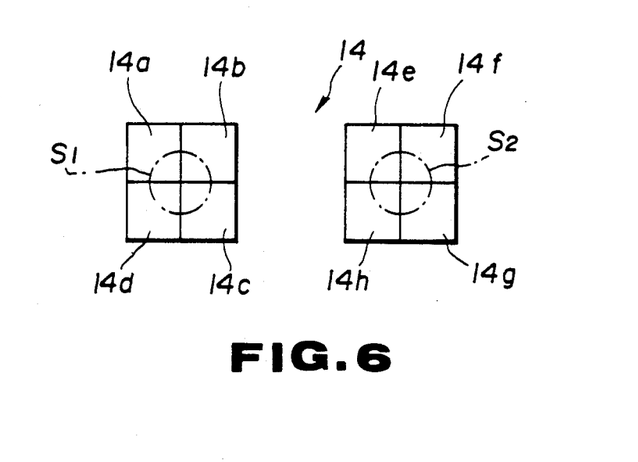
FIG. 6 is an enlarged plan view showing a photo-detecting element constituting the optical pickup apparatus shown in FIG. 5.

The fluxes of light, the optical path of which is separated depending upon the direction of polarization by the prism 8 are detected by a photo detecting element 14. The photo-detecting element 14 has a plurality of photo-receiving areas for receiving the fluxes of light separated by the prism 8 as shown in FIG. 6. The photo-detecting element 14 is capable of independently outputting photo detection signals each corresponding to the intensity of light at light receiving area through a plurality of leads (not shown).

In the photo detecting element 14, a first beam spot S, formed of the first flux of light reflected on the polarization reflection surface 8c is formed on first to fourth photo receiving areas 14a, 14b, 14c and 14d. A second beam spot $S_2$ formed by the second flux of light transmitted through the polarization reflection surface 8c is formed on fifth to eighth photo receiving area 12e, 12f, 12g and 12h.

The first to fourth photo-receiving areas 14a, 14b, 14c and 14d are disposed so that they respectively receive the light on the quadrants of the first beam spot $S_1$ arranged around the center thereof. The direction of the lines along which the first to fourth photo-receiving areas 14a, 14b, 14c and 14d are disposed is at 45° relative to the direction of an axis of the cylindrical lens 13.

The fifth to eighth photo-receiving area 14e, 14f, 14g and 14h are disposed so that they respectively receive the light on the quadrant of the first beam spots $S_2$ arranged around the center thereof. The direction of the lines along which the fifth to eighth photo-receiving areas 14e, 14f, 14g and 14h are disposed is at 45° relative to the direction of an axis of the cylindrical lens 13.

An astigmatism of the flux of light transmitting through the cylindrical lens 13 caused thereby exhibits in a direction of the axis of the cylindrical lens 13 and in a direction perpendicular thereto. Accordingly, if photo detection outputs from the first to fourth photo receiving areas 14a, 14b, 14c and 14d are represented as $E_A$, $E_B$, $E_C$ and $E_D$, respectively, the focus error signal Fe can be expressed by a formula as follows:

$$Fe = (E_A + E_C) - (E_B + E_D)$$

The first to fourth photo-receiving areas 14a, 14b, 14c and 14d are disposed so that they are successively adjacent to each other. The first and third photo receiving areas 14a and 14c, the second and fourth photo receiving areas 14f and 14d are diagonally disposed on opposite sides of the center of the first beam spot $S_1$.

If photo detection outputs from the fifth to eighth photo receiving areas 14e, 14f, 14g and 14h are represented as $E_E$, $E_F$, $E_G$ and $E_H$, respectively, the focus error signal Fe can be expressed by a formula as follows:

$$Fe = (E_E + E_F) - (E_G + E_H)$$

The fifth to eighth photo-receiving areas 14e, 14f, 14g and 14h are disposed so that they are successively adjacent to each other. The fifth and eighth photo receiving area 14e and 14g, the sixth and eighth photo receiving areas 14f and 14h are diagonally disposed on opposite sides of the center of the first beam spot $S_2$.

Since the focus error signal is obtained from both of the flux of light reflected by the polarization reflection surface 8c and the flux of light transmitted through the polarization reflection surface 8c, in the optical pickup apparatus, accurate focus error signals can be obtained by canceling fluctuations of both fluxes with each other without being influenced by so-called refringence in a substrate of the magneto-optical disc 1.

In the optical pickup apparatus, a read signal Mo can be expressed by the formula as follows:

$$Mo = (E_A + E_B + E_C + E_D) - (E_E + E_F + E_G + E_H)$$

In the optical pickup apparatus of the present invention which includes the photo-detector 7, the focus error signal Fe and the read signal Mo of informational signal written on the magneto-optical disc 1 can be obtained by a simple structure.

Figure 7:
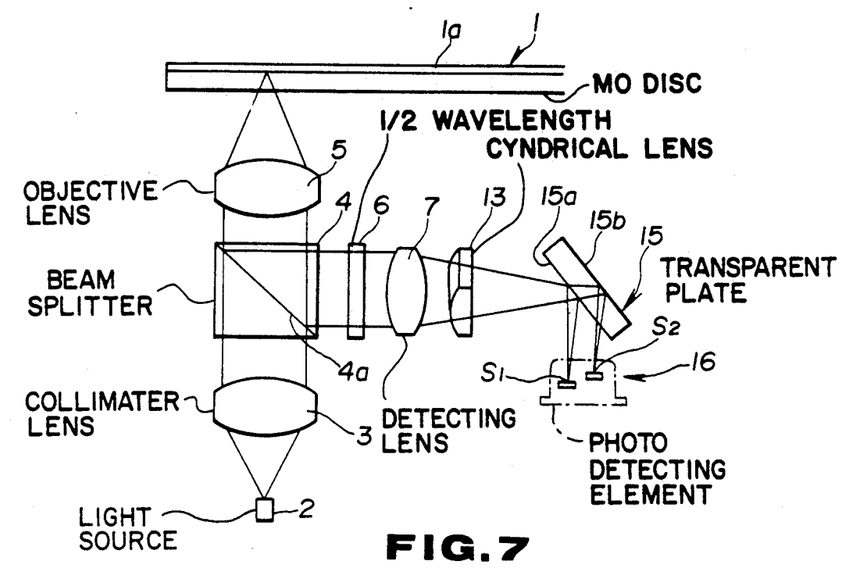
FIG. 7 is an elevational view schematically showing the other structure of an optical pickup apparatus.

Referring now to FIG. 7, there is shown a further embodiment of an optical pickup apparatus of the present invention. This embodiment is substantially identical with the former embodiment of FIG. 5 except that a flat plate like transparent member 15 is used in lieu of the prisms 8 and 11.

The optical pickup apparatus comprises a light source 2, a collimator lens 3, a beam splitter 4 and an objective lens 5, etc. as is similarly to the above-mentioned optical pickup apparatus, and is formed so that a flux of light is incident upon the surface of the signal recording layer 1a of the magneto-optical disc 1.

In the optical pickup apparatus, the flux of light which was reflected by the surface of the signal recording layer 1a and reached at a detecting lens 7 via the objective lens 5 and the beam splitter 4 will transmit through the detecting lens 7 and will then transmit through a cylindrical lens 13 and be incliningly incident upon the flat plate like transparent member 15.

On side of the flat plate like transparent member 15 upon which the flux of light is incident is coated with an dielectric film etc to provide a polarization reflection surface 15a having a reflection factor changing depending upon the polarization direction of the incident flux of light. The other side of the flat plate like transparent member 15 which is opposite to the polarization reflection surface 15a of the transparent member 15 is made a so-called total reflection surface 15b so that the flux of light which has transmitted through the polarization reflection surface 15a is reflected thereon.

A part of the flux of light which is incident on the flat plate like transparent member 15 is reflected on the polarization reflection surface 15a and the remaining flux is transmitted through the polarization reflection surface 15. The flux of light reflected on the polarization reflection surface 15 is incident upon the photo-receiving surface of the photo-detecting element 16. The flux of light transmitted through the polarization reflection surface 15a is then reflected on the total reflection surface 15b and is transmitted through the flat plate like transparent member 15 and is exited from the member 15 and is then incident upon the photo-receiving areas of the photo-detecting element 16. The flux of light which has been the flat plate like transparent member 15 and transmitted therethrough 8 in such a manner is subjected to separation of optical paths depending upon the difference of it's polarization direction.

Figure 8:
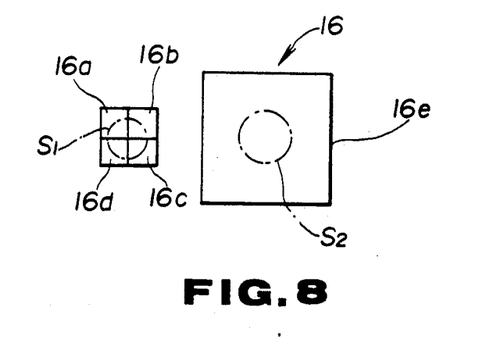
FIG. 8 is an enlarged plan view showing a photo-detecting element constituting the optical pickup apparatus shown in FIG. 7.

The light receiving surface of the photo detecting element 16 has a plurality of light receiving areas each receiving the flux of light, the optical path of which is separated by the flat plate like transparent member 15 as shown in FIG. 8. The photo detecting element 16 receives each of flux of light at the plurality of light receiving area and is capable of independently outputting photo detection signals each corresponding to the intensity of light at light receiving area through a plurality of leads (not shown).

In the photo-detecting element 16, a first beam spot $S_1$ formed of the first flux of light reflected on the polarization reflection surface 15a is formed on first to fourth photo-receiving areas 16a, 16b, 16c and 16d. A second beam spot $S_2$ formed of the second flux of light which has transmitted through the polarization reflection surface 15a is formed on a fifth photo-receiving area 16e.

The first to fourth photo-receiving areas 16a, 16b, 16c and 16d are disposed so that they respectively receive the light on the quadrants of the first beam spot $S_1$ arranged around the center thereof. The direction of the lines along which the first so fourth photo-receiving areas 16a, 16b, 16c and 16d are disposed is at 45° relative to the direction of an axis of the cylindrical lens 13.

An astigmatism of the flux of light transmitting through the cylindrical lens 13 caused thereby exhibits in a direction of the axis of the cylindrical lens 13 and in a direction perpendicular thereto. Accordingly, if photo detection outputs from the first to fourth photo receiving areas 16a, 16b, 16c and 16d are represented as $E_A$, $E_B$, $E_C$ and $E_D$, respectively, the focus error signal Fe can be expressed by a formula as follows:

$$Fe=(E_A+E_C)-(E_B+E_D)$$

The first to fourth photo-receiving areas 16a, 16b, 16c and 16d are disposed so that they are successively adjacent to each other. The first and third photo receiving areas 16a and 16c the second and fourth photo receiving areas 16b and 16d are diagonally disposed on opposite sides of the center of the first beam spot $S_1$.

If the photo detection output $E_E$ obtained from the fifth photo receiving area 16e is represented as $E_E$, the read signal Mo can be expressed by a formula as follows:

$$Mo=(E_A+E_B+E_C+E_D)-E_E$$

As mentioned above, in the optical pickup apparatus of the present invention, light reflected form a recording medium which is inclinedly incident from one side upon of a flat plate like transparent member having the one side which is a polarization reflection surface and the other side which is a total reflection surface is separated at the one side thereof into two fluxes of light depending upon the direction of polarization. The flux of light reflected on the one side and the flux of light which has transmitted through the one side and has been reflected on the other side of the transparent member are detected by a photo-detecting elements.

The polarization direction of reflected light from the recording medium can be detected by comparing the intensity of the flux of light reflected on the one side of the transparent member with that of the flux of light transmitted through the one side based upon photo-detection outputs from the photo-detecting element.

Since the structure is simplified in the optical pickup apparatus, a focus error signal, etc representative of the amount of the focus error of the flux of light on the recording medium can be detected in a good manner without causing any offset due to so-called tracking deviation and without being influenced by so-called birefringence in the recording medium.

In other words, the present invention provides an optical pickup apparatus in which a focus offset is prevented from occurring and reading of informational signals written on a recording medium can be satisfactorily achieved without complicating the structure.

What is claimed is:

1. An optical pickup apparatus for reading information recorded on an optical recording medium, the optical pickup apparatus comprising:

a light source;

an objective lens for focussing a light beam irradiated from the light source on the optical recording medium;

photo detecting means for detecting a returning light beam from the optical recording medium;

beam splitting means for splitting the light beam from the light source and the returning light beam from the optical recording medium, the beam splitting means being arranged between the light source and the objective lens;

a plate-like optical element having a first surface and a second surface which is parallel to the first surface, the first surface being a polarization reflection surface and the second surface being a total reflection surface, the first surface and the second surface being disposed in an optical path of the returning light beam from the recording medium to the photo detecting means so that the returning light beam is incident at an inclined angle on the first surface and the second surface, wherein the returning light beam is divided by the plate-like optical element into at least two light beams which, upon exiting the plate-like optical element, have different focusing points at the photo detecting means; and wherein the photodetecting means separately detects the flux of each of the two light beams.

2. An optical pickup apparatus as defined in claim 1 in which the photo detecting means comprises a pair of photo-receiving elements and at least one of the photo-receiving elements is comprised of a plurality of photo-receiving areas.

3. An optical pickup apparatus as defined in claim 2 in which the pair of photo-receiving elements of the photo detecting means each comprises a plurality of photo-receiving areas.

4. An optical pickup apparatus as defined in claim 3 in which the pair of photo receiving areas are formed so that the tangential direction of a recording track of the recording medium is parallel with the directions of boundaries between the photo receiving areas.

5. An optical pickup apparatus as defined in claim 2 in which the optical pickup apparatus comprises focus detecting optical elements disposed in an optical path of the returning light beam from the recording medium to the photo detecting means which cause a change in the shape of the beam depending upon the displacement of the recording medium in a perpendicular direction relative to the surface of the recording medium.

6. An optical pickup apparatus as defined in claim 5 in which at least one of the pair of photo-receiving elements of the photo detecting means comprises first, second, third and fourth photo-receiving areas, these four photo-receiving areas being disposed so that they are successively adjacent to one another, and the first and third photo-receiving areas and the second and fourth photo-receiving areas face each other on the opposite sides of the center of the light beam incident upon the photo-receiving elements.

7. An optical pickup apparatus as defined in claim 1 in which the optical pickup apparatus includes an optical member for introducing the returning light beam from the recording medium to the plate-like optical element disposed in front of the plate-like optical element in the optical path of the returning light beam from the recording medium to the photo detecting means.

8. An optical pickup apparatus as defined in claim 1, wherein the photo detecting means separately detects the flux of each of the two light beams upon receiving the two light beams directly from the plate-like optical element.

9. An optical pickup apparatus for reading information recorded on an optical recording medium, the optical pickup apparatus comprising:
a light source;
an objective lens for focussing a light beam irradiated from the light source on the optical recording medium;
photo detecting means for detecting a returning light beam from the optical recording medium;
beam splitting means for splitting the light beam from the light source and the returning light beam from the optical recording medium, the beam splitting means being arranged between the light source and the objective lens;
a plate-like optical element having a first surface and a second surface which is parallel to the first surface, the first surface being a polarization reflection surface and the second surface being a total reflection surface, the first surface and the second surface being disposed in an optical path of the returning light beam from the recording medium to the photo detecting means so that the returning light beam is incident at an inclined angle on the first surface and the second surface, wherein the returning light beam is divided by the plate-like optical element into two light beams which, upon exiting the plate-like optical element, impinge with different focusing points directly on the photodetecting means; and
wherein the photodetecting means separately detects the flux of each of the two light beams.

* * * * *

UNITED STATES PATENT AND TRADEMARK OFFICE
CERTIFICATE OF CORRECTION

PATENT NO. : 5,249,167
DATED : September 28, 1993
INVENTOR(S) : Katsuhiro Seo

It is certified that error appears in the above-indentified patent and that said Letters Patent is hereby corrected as shown below:

On the title page: Item [54] and Column 1, line 1, change "OPTICAL PICKUP APPARATUS WHICH INCLUDES A PLATE-LIKE ELEMENT FOR SPLITTING A RETURNING LIGHT BEAN INTO DIFFERENT LIGHT BEAMS HAVING DIFFERENT FOCUSSING POINT" to -- OPTICAL PICKUP APPARATUS WHICH INCLUDES A PLATE-LIKE ELEMENT FOR SPLITTING A RETURNING ALIGHT BEAM INTO DIFFERENT LIGHT BEAMS HAVING DIFFERENT FOCUSSING POINT --.

Signed and Sealed this

Fourteenth Day of March, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,249,167
DATED : September 28, 1993
INVENTOR(S) : Katsuhiro Seo

It is certified that error appears in the above-indentified patent and that said Letters Patent is hereby corrected as shown below:

On the title page:
At [54] Title, Front Page of Patent, change "OPTICAL PICKUP APPARATUS WHICH INCLUDES A PLATE-LIKE ELEMENT FOR SPLITTING A RETURNING ALIGHT BEAM INTO DIFFERENT LIGHT BEAMS HAVING DIFFERENT FOCUSSING POINT" to --OPTICAL PICKUP APPARATUS WHICH INCLUDES A PLATE-LIKE ELEMENT FOR SPLITTING A RETURNING LIGHT BEAM INTO DIFFERENT LIGHT BEAMS HAVING DIFFERENT FOCUSSING POINTS--.

This certificate supersedes Certificate of Correction issued (March 14, 1995).

Signed and Sealed this

Twenty-third Day of May, 1995

Attest:

BRUCE LEHMAN

*Attesting Officer*     *Commissioner of Patents and Trademarks*